(12) United States Patent
McMillian

(10) Patent No.: US 11,426,835 B2
(45) Date of Patent: Aug. 30, 2022

(54) SCREW THREAD ROLLER BURNISHING APPARATUS

(71) Applicant: Knust-Godwin LLC, Katy, TX (US)

(72) Inventor: Thomas R. McMillian, Houston, TX (US)

(73) Assignee: KNUST-GODWIN LLC, Katy, TX (US)

( * ) Notice: Subject to any disclaimer, the term of this patent is extended or adjusted under 35 U.S.C. 154(b) by 259 days.

(21) Appl. No.: 16/447,313

(22) Filed: Jun. 20, 2019

(65) Prior Publication Data

US 2019/0299358 A1 Oct. 3, 2019

Related U.S. Application Data

(62) Division of application No. 14/770,925, filed as application No. PCT/US2014/010477 on Jan. 7, 2014, now Pat. No. 10,369,677.

(Continued)

(51) Int. Cl.
  *B24B 39/04* (2006.01)
  *B24B 39/02* (2006.01)
  (Continued)

(52) U.S. Cl.
  CPC .............. *B24B 39/023* (2013.01); *B23G 9/00* (2013.01); *B24B 39/003* (2013.01); *B24B 39/045* (2013.01); *B21H 3/08* (2013.01)

(58) Field of Classification Search
  CPC ..... B24B 39/003; B24B 39/04; B24B 39/045; B21H 3/04; B21H 3/042; B21H 3/046;
  (Continued)

(56) References Cited

U.S. PATENT DOCUMENTS

| 241,750 A | 5/1881 | Taber |
| 932,168 A | 8/1909 | Parker |

(Continued)

FOREIGN PATENT DOCUMENTS

| GB | 2182591 | 5/1987 |
| JP | 60044221 A | 3/1985 |
| SU | 1606246 | 11/1990 |

OTHER PUBLICATIONS

International Search Report and Written Opinion issued for PCT/US2014/010477 dated May 12, 2014, 7 pages.

*Primary Examiner* — Edward T Tolan
(74) *Attorney, Agent, or Firm* — Haynes and Boone, LLP

(57) ABSTRACT

Internal and external screw thread burnishing assemblies are provided. In the internal screw thread burnishing assembly, diametrically opposed removable cartridges carrying burnishing wheels are received in cavities of a support structure axially movable into the space circumscribed by the internal screw thread. Fluid pressure is utilized to forcibly translate the cartridges radially outwardly to place their burnishing wheels into burnishing engagement with the internal screw thread, with a spring structure resiliently biasing the cartridges toward retracted orientations thereof within the support structure. In the external screw thread burnishing assembly, burnishing wheels are carried on the outer ends of pivotally supported arms which may be pivoted by fluid pressure to drive the burnishing wheels into burnishing engagement with diametrically opposite portions of the external screw thread, with a spring structure resiliently biasing the arms pivotally away from one another.

21 Claims, 17 Drawing Sheets

Related U.S. Application Data

(60) Provisional application No. 61/772,713, filed on Mar. 5, 2013.

(51) Int. Cl.
    *B23G 9/00*    (2006.01)
    *B24B 39/00*   (2006.01)
    *B21H 3/08*    (2006.01)

(58) Field of Classification Search
    CPC . B21D 22/14; B21D 22/18; B23P 9/00; B23P 9/02; B23G 5/083; B23G 5/086; B23G 5/10
    See application file for complete search history.

(56) References Cited

U.S. PATENT DOCUMENTS

| | | | |
|---|---|---|---|
| 1,830,926 A | 11/1931 | Burnish | |
| 2,040,347 A | 5/1936 | Twyman | |
| 2,174,803 A | 10/1939 | Mundt et al. | |
| 2,915,809 A * | 12/1959 | Egger, Jr. | B24B 39/04 |
| | | | 29/90.01 |
| 3,212,166 A * | 10/1965 | Wolff | B24B 5/38 |
| | | | 29/90.01 |
| 3,283,553 A * | 11/1966 | George | B21D 17/04 |
| | | | 72/116 |
| 3,290,914 A | 12/1966 | Vaill et al. | |
| 3,343,390 A | 9/1967 | Harris | |
| 3,559,258 A | 2/1971 | Gardner | |
| 3,675,454 A * | 7/1972 | Pratt | B21H 5/022 |
| | | | 72/108 |
| 3,751,781 A | 8/1973 | Koppelmann | |
| 3,840,957 A | 10/1974 | Koppelmann | |
| 3,866,281 A * | 2/1975 | Kunze | B24B 39/06 |
| | | | 29/90.01 |
| 3,867,824 A * | 2/1975 | Takagi | B21D 19/046 |
| | | | 72/118 |
| 3,956,914 A | 5/1976 | Prochaska | |
| 4,322,961 A * | 4/1982 | Greis | B21H 3/04 |
| | | | 72/104 |
| 4,426,869 A | 1/1984 | Farmer et al. | |
| 4,706,483 A | 11/1987 | Perraudin | |
| 4,870,845 A * | 10/1989 | Nakagawa | B21H 7/185 |
| | | | 72/1 |
| 4,930,326 A * | 6/1990 | Rottinghaus | B21D 39/046 |
| | | | 72/121 |
| 5,099,558 A * | 3/1992 | Wilson | B24B 39/04 |
| | | | 29/90.01 |
| 5,351,516 A | 10/1994 | Bialy | |
| 6,748,779 B2 * | 6/2004 | Allart | B21H 3/048 |
| | | | 72/104 |
| 2005/0115293 A1 * | 6/2005 | Goh | B23P 9/02 |
| | | | 72/84 |

\* cited by examiner

SCREW THREAD ROLLER BURNISHING APPARATUS

CROSS-REFERENCE TO RELATED APPLICATION

This application is a divisional of U.S. application Ser. No. 14/770,925 filed Aug. 27, 2015 which is a 371 national phase application of PCT Application Number: PCT/US2014/010477, filed Jan. 7, 2014, which claims priority to and the benefit of U.S. Provisional Application No. 61/772,713 filed Mar. 5, 2013, the disclosures of which are incorporated herein by reference in their entireties.

BACKGROUND OF THE INVENTION

This invention relates to the burnishing of internal and external screw threads. The term "burnishing", as applied to screw threads, means the smoothing out and inwardly deepening of the root surfaces of the screw thread. Screw thread burnishing is typically employed to cold roll and plastically deform the root areas to substantially eliminate stress cracks in the roots which might otherwise cause threaded joint leakage or failure in high stress applications such as in the threaded-together tubular structures utilized in deep downhole fluid recovery systems.

While the desirable results of screw thread burnishing are well known, conventional burnishing equipment and techniques have typically been difficult and complicated—particularly with respect to supporting the work piece (such as a threaded tubular collar for downhole applications) and the thread burnishing equipment. As but one example, a primary difficulty is typically encountered in preventing the imposition of undesirably large net burnishing forces on the work piece (when, for example, it is chucked into a lathe)—a process normally requiring rather intricate custom designed additional support structure which is difficult and time consuming to fabricate and properly install. Additionally, a variety of custom burnishing structures are typically required for different types and sizes of threaded work pieces.

In both internal and external screw thread applications, a need exists for improved thread roller burnishing apparatus which advantageously overcomes these and other problems, limitations and disadvantages commonly associated with conventional thread burnishing equipment. It is to this need that the present invention is primarily directed.

DETAILED DESCRIPTION

Figure 1:
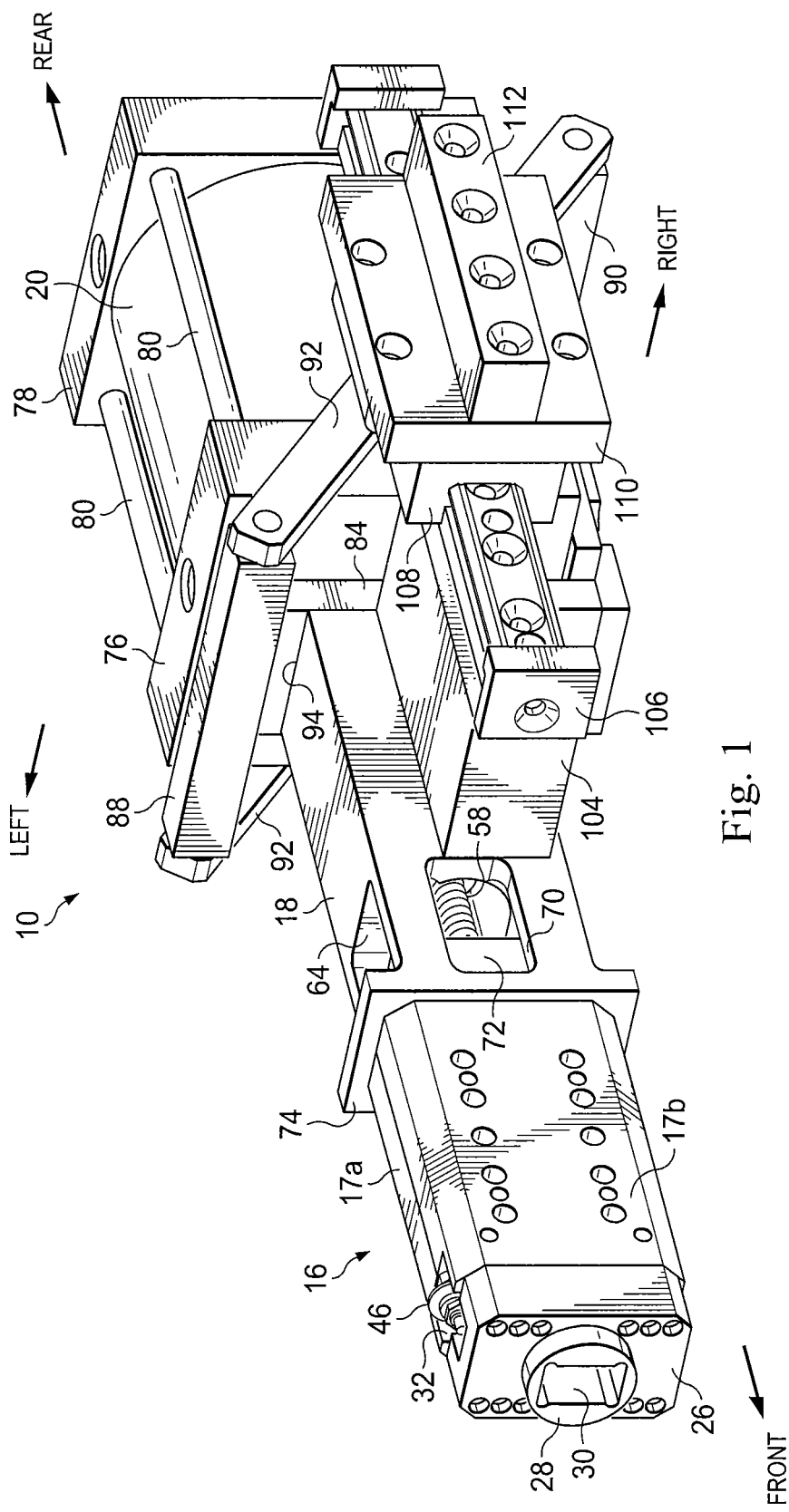
FIG. 1 is a right side perspective view of an internal screw thread roller burnishing assembly embodying principles of the present invention.

Turning now to the accompanying drawings, a representative internal screw thread embodiment 10 of a screw thread roller burnishing assembly embodying principles of the present invention is perspectively illustrated in FIG. 1 and, as later described herein, is utilized to burnish the thread root portions of an internal screw thread 12 formed in an end 14a of a tubular work piece member 14 (see FIGS. 9 and 10) which is chucked into a lathe (not shown) operable to rotate the tubular member 14 about its axis. Representatively, the internal screw thread 12 is of a tapered configuration, but could alternatively be of a straight, non-tapered configuration. Additionally, while the work piece 14 is illustratively tubular in shape, it could be of many different shapes having internal screw threads incorporated therein.

A detailed illustration of the structure of the roller burnishing assembly 10 is provided in FIGS. 1-8, with the illustrated "front", "rear", "left" and "right" arrows having been added to facilitate comparison between and among the various views of the assembly. Turning now to FIGS. 1-8, from front to back the overall roller burnishing assembly 10 includes a generally rectangular roller head assembly 16, a generally rectangular spacer adapter housing 18 having a front end secured to the rear end of the roller head assembly 16, and a pressurized air cylinder 20 disposed at the rear end of the spacer adapter housing 18.

The roller head assembly 16 has separable left and right housing side portions 17a,17b with facing horizontally extending inner side surface grooves 22 (the left side one of which is visible in FIGS. 2, 4 and 8) that together form an interior passage 24 (see FIGS. 4 and 8) extending in a front-to-rear direction through the roller head assembly 16. A front end block 26 is secured to the front end of the roller head assembly 16 and has a forwardly projecting cylindrical centering boss 28 with an opening 30 rearwardly extending therethrough into the interior passage 24 of the roller head assembly 16. An opposed pair of pockets 32 disposed immediately behind the front end block 26 extend vertically through the top and bottom sides of the roller head assembly 16 and slidably and removably receive upper and lower roller cartridge assemblies 34,36.

Figure 2:
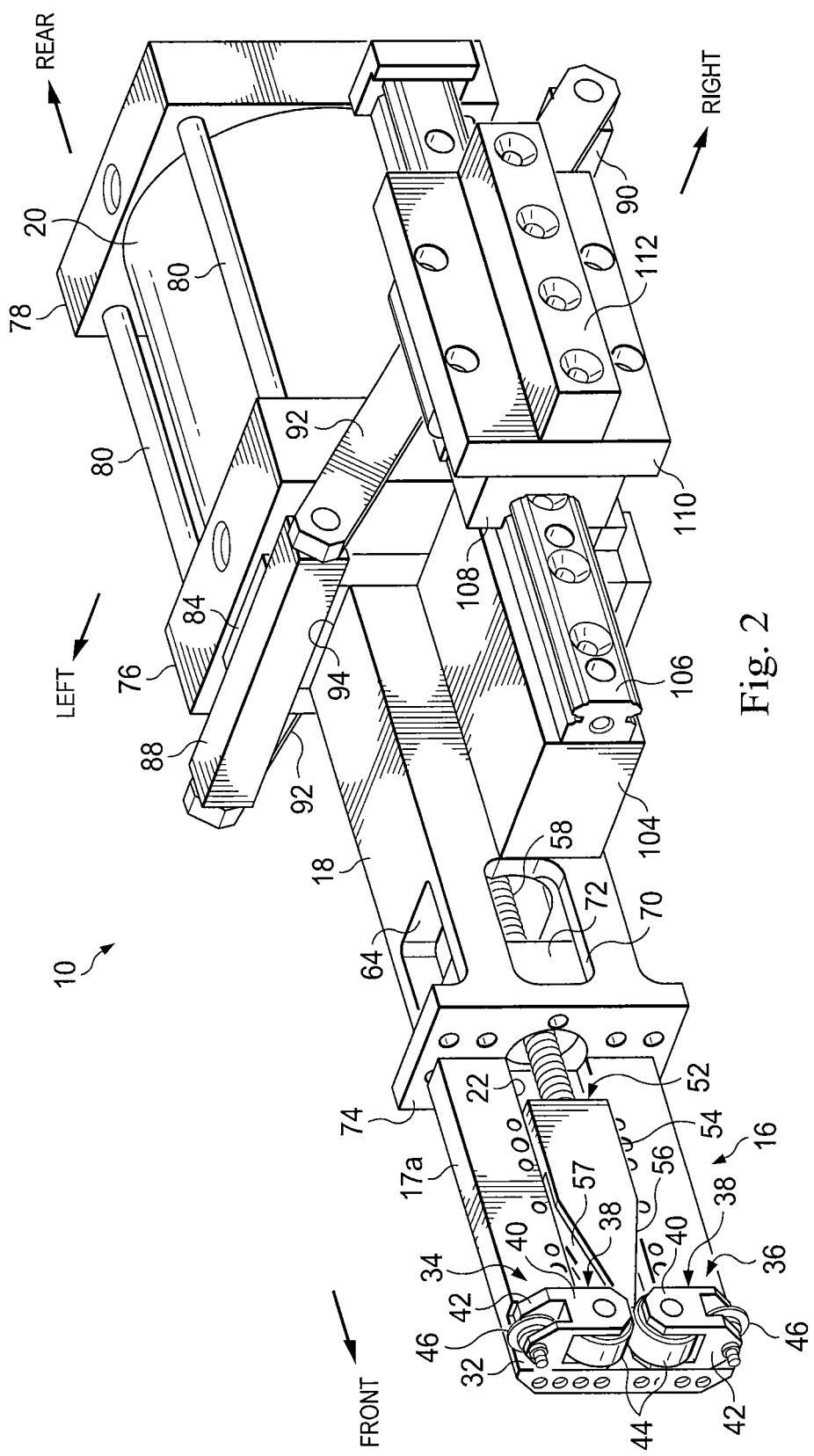
FIG. 2 is a right side partially cut away perspective view of the FIG. 1 assembly.
Figure 3:
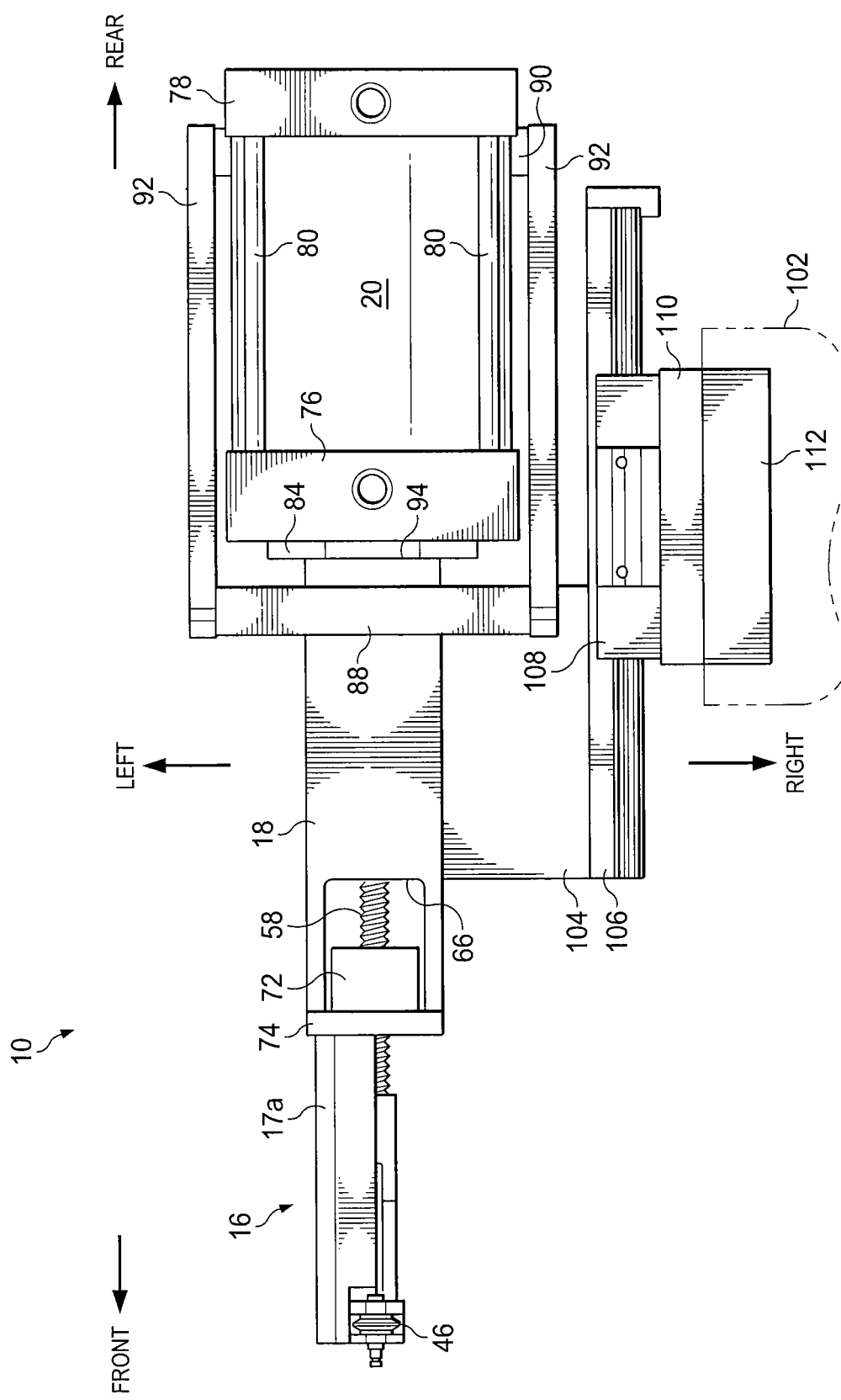
FIG. 3 is a top plan view of the assembly as shown in FIG. 2.
Figure 4:
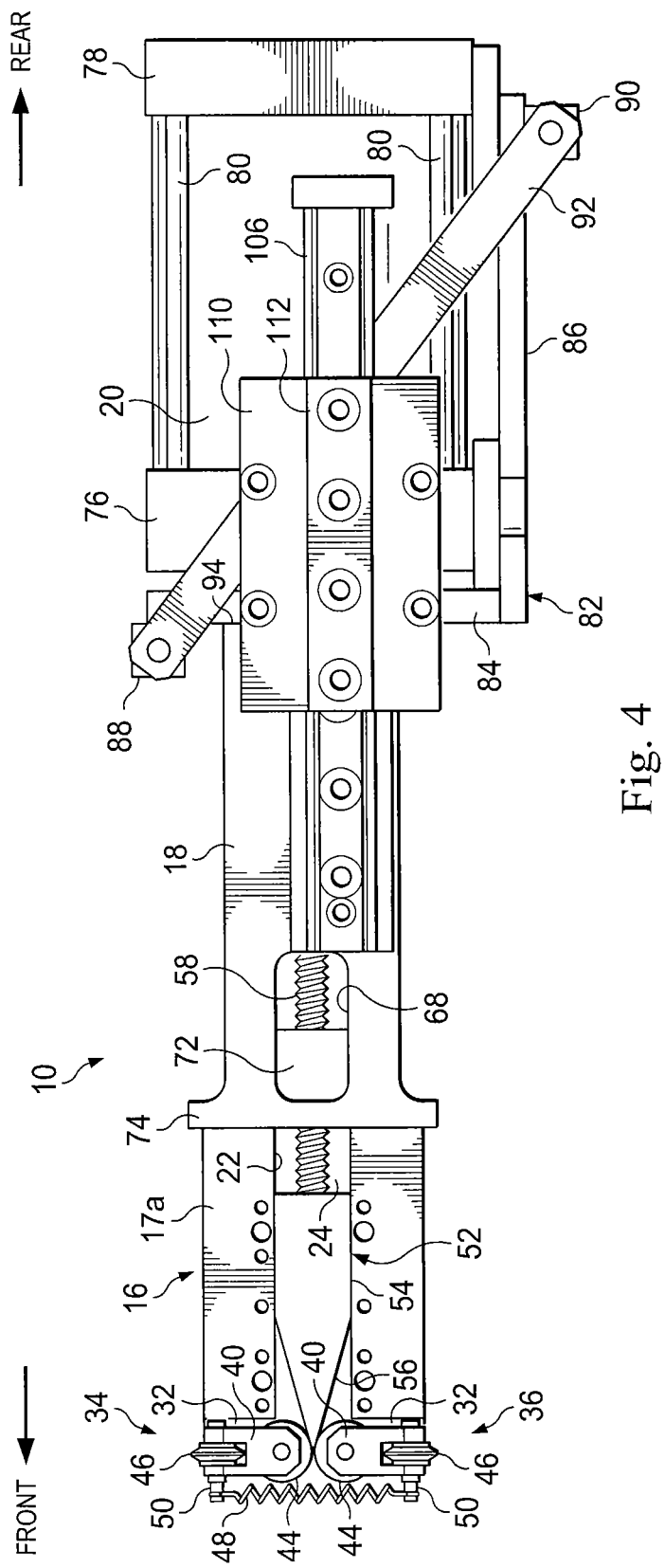
FIG. 4 is a right side elevational view of the assembly as shown in FIG. 2

As may be best seen in FIG. 2, each of the roller cartridge assemblies 34,36 has a frame 38 with an inner yoke portion 40 and an outer yoke portion 42. Inner yoke portion 40 carries a cam follower wheel 44 for rotation relative to the frame 38 about a left-to-right extending axis, and outer yoke portion 42 rotatably carries a thread burnishing wheel 46 for rotation relative to the frame 38 about a front-to-rear extending axis. A tension spring 48 (see FIGS. 4 and 8) connected between forwardly projecting spring anchors 50 on the outer yokes 42 resiliently biases the opposed upper and lower roller cartridge assemblies 34,36 vertically inwardly toward their fully retracted positions shown in FIGS. 2, 4 and 8. By removing the spring 48, the roller cartridge assemblies 34,36 may be outwardly removed from their roller head assembly pockets 32 and quickly and easily replaced with other cartridges carrying thread burnishing wheels of different sizes to adapt the burnishing assembly 10 for varying thread root radii specifications.

Rearwardly of the cam follower wheels 44, a wedge cam member 52 (see FIGS. 2, 4 and 8-10) is slidably received in the interior roller head assembly passage 24 for forward and rearward movement therein and has a rectangular rear portion 54, a triangularly shaped front portion 56, and a rearwardly extending spring clearance slot 57 (see FIG. 2) formed in the front portion 56. The top and bottom sides of the front cam portion 56 are tapered relative to the rear cam portion 54. Representatively, the taper angle is approximately fifteen degrees, but could be larger or smaller if necessary or desired. A front end of a threaded cam drive rod 58 is threaded into the rear cam portion 54 as at 58*a* (see FIG. 8), the rod 58 extending rearwardly from its cam connection location 58*a* through a central opening 60 (see FIG. 8) in the front end of the spacer adapter housing 18, and then through the interior of the housing 18 wherein the rear end of the rod 58 is adjustably secured, as subsequently described herein, to a tubular, internally threaded adapter structure 62 (see FIGS. 5, 6 and 8) within the housing 18. As illustrated in FIGS. 1-8, the spacer adapter housing 18 has top and bottom wall openings 64,66 and left and right side wall openings 68,70. For purposes subsequently described herein, a floating stop block 72 having an inverted U-shaped configuration slidably straddles the threaded rod 58 inwardly adjacent the inner side of the front end wall 74 of the spacer adapter housing 18.

The pressurized air cylinder portion 20 of the burnishing assembly 10 is disposed rearwardly of the spacer adapter housing 18 and positioned between front and rear upright rectangular blocks 76,78 having opposed corner portions interconnected by tie rods 80. Air cylinder 20 and blocks 76,78 are positioned on a generally L-shaped frame structure 82 (see FIGS. 4-6 and 8) having a vertical front plate portion 84 and a horizontal bottom plate portion 86. Frame 82 is braced by means of a front bar 88 positioned against a front upper surface area of the vertical front plate portion 84, a rear bar 90 positioned against a rear bottom side surface of the bottom plate portion 86, and a pair of diagonally extending tension bracing bars 92 positioned on opposite sides of the air cylinder 20 and connected at their opposite ends to the opposite ends of the front and rear bars 88,90 as shown. The vertical front plate portion 84 of the frame structure 82 is suitably secured to the rear end 94 of the spacer adapter housing 18, thereby supporting the air cylinder 20 on the spacer adapter housing 18 as shown.

Figure 5:
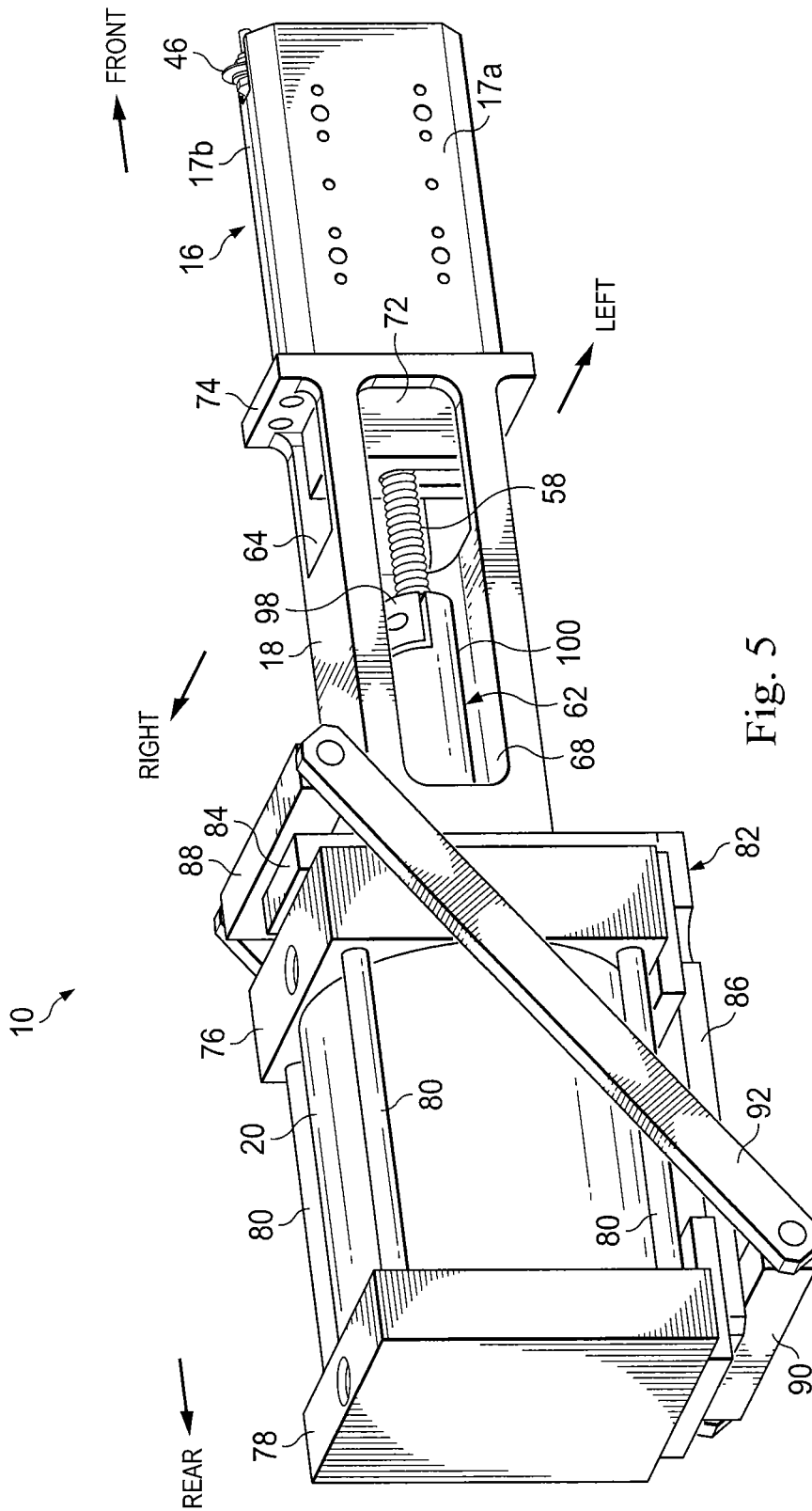
FIG. 5 is a rear left side perspective view of the FIG. 1 assembly.
Figure 6:
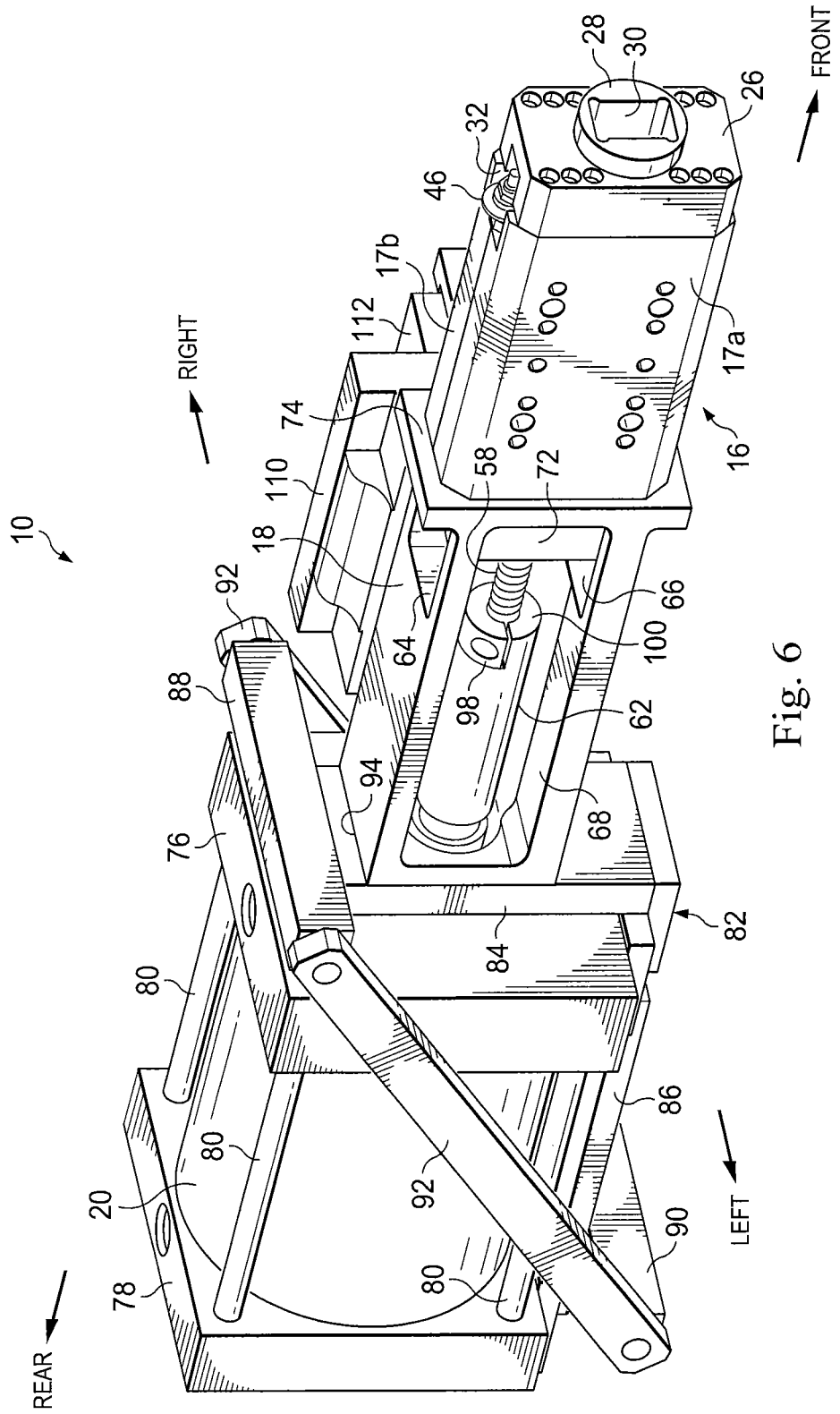
FIG. 6 is a front left side perspective view of the FIG. 1 assembly.
Figure 7:
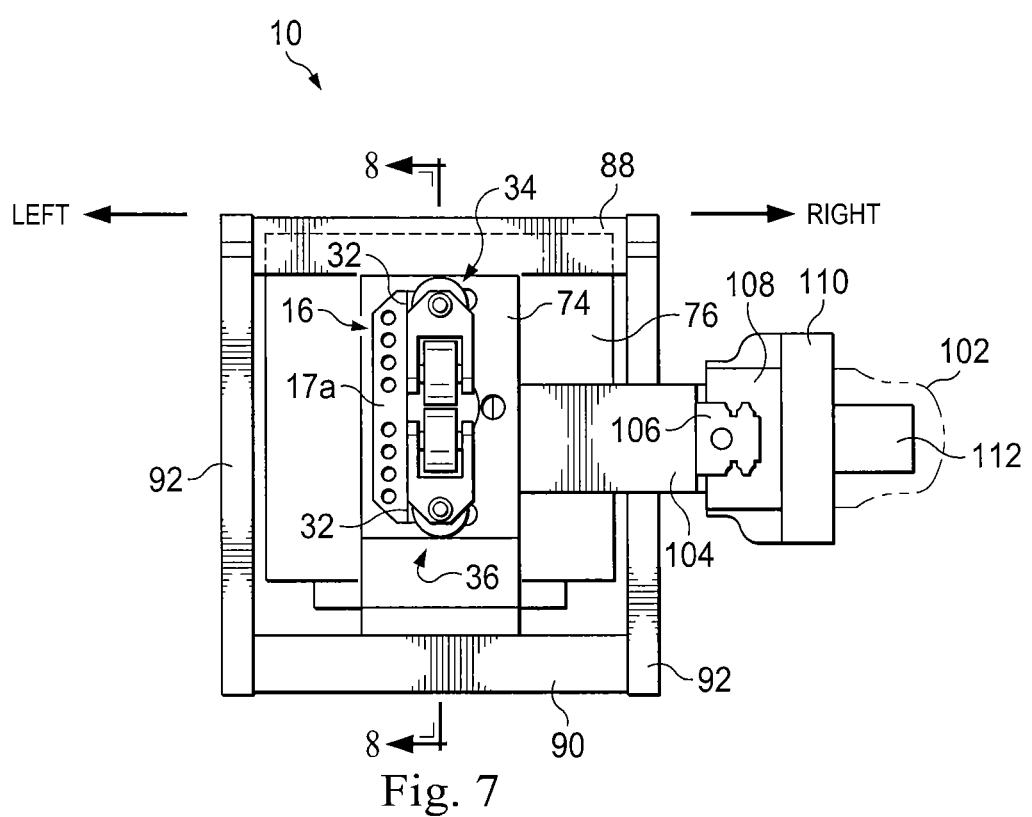
FIG. 7 is a front end elevational view of the partial assembly as shown in FIG. 2.
Figure 8:
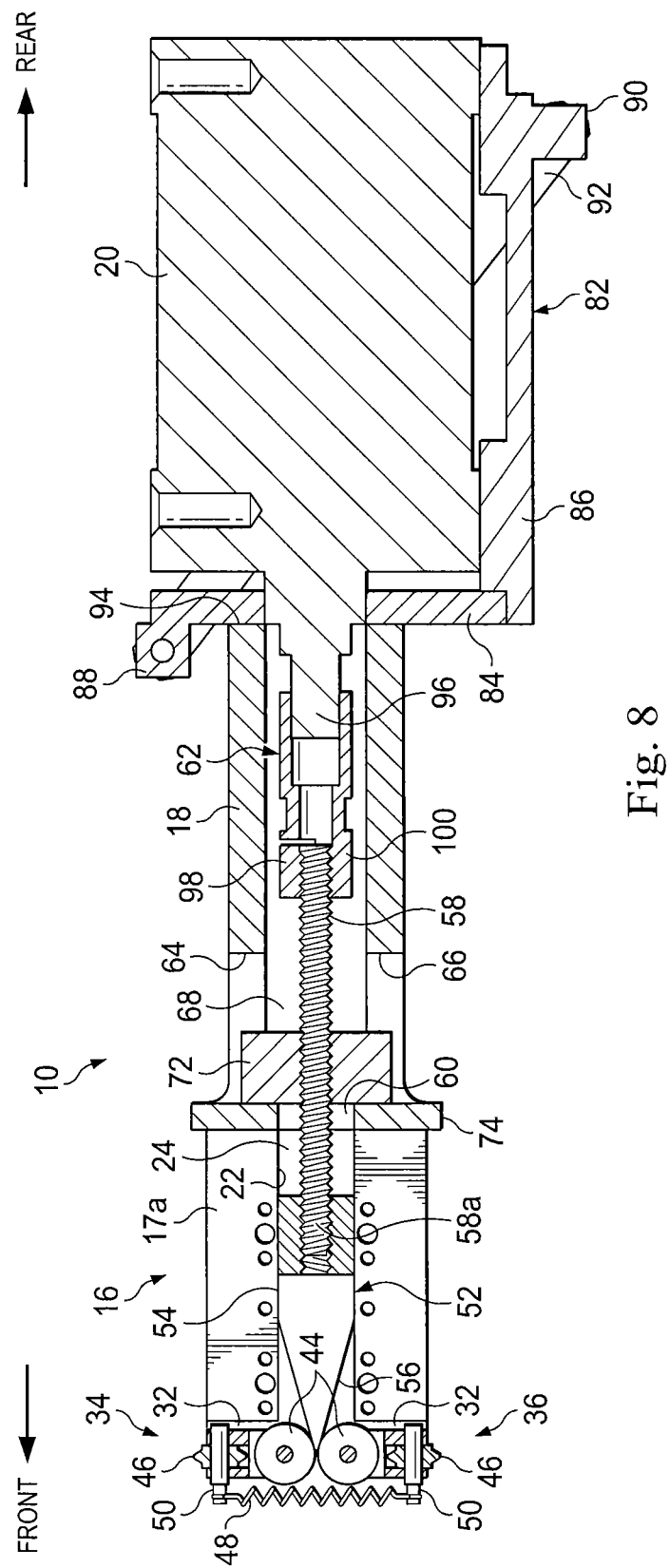
FIG. 8 is a simplified schematic cross-sectional view through the FIG. 2 assembly taken along line 8-8 of FIG. 7.

With reference now to FIGS. 5, 6 and 8, at its front end the air cylinder 20 has a pressure extendable drive rod 96 (see FIG. 8) which is threaded into the rear end of the tubular adapter structure 62. The rear end of the threaded rod 58 is locked into a front end portion of the adapter structure 62 by means of an internally threaded top cap member 98 which is bolted to an underlying, internally threaded front end portion 100 of the tubular adapter structure 62.

The length of the rod 58 extending between the cam 52 and the front end of the adapter structure 62 may be selectively varied by simply removing the top cap 98 and adjusting the length that the rear end of the rod projects into the interior of the adapter structure 62. When such adjustment is made, the cap 98 is reinstalled over the front end portion 100 of the adapter 62, whereupon the internal threads on the cap 98 and the front adapter end portion 100 mesh with the rod threads in a manner preventing the length-adjusted rod 58 from longitudinally moving relative to the adapter structure 62.

Figure 9:
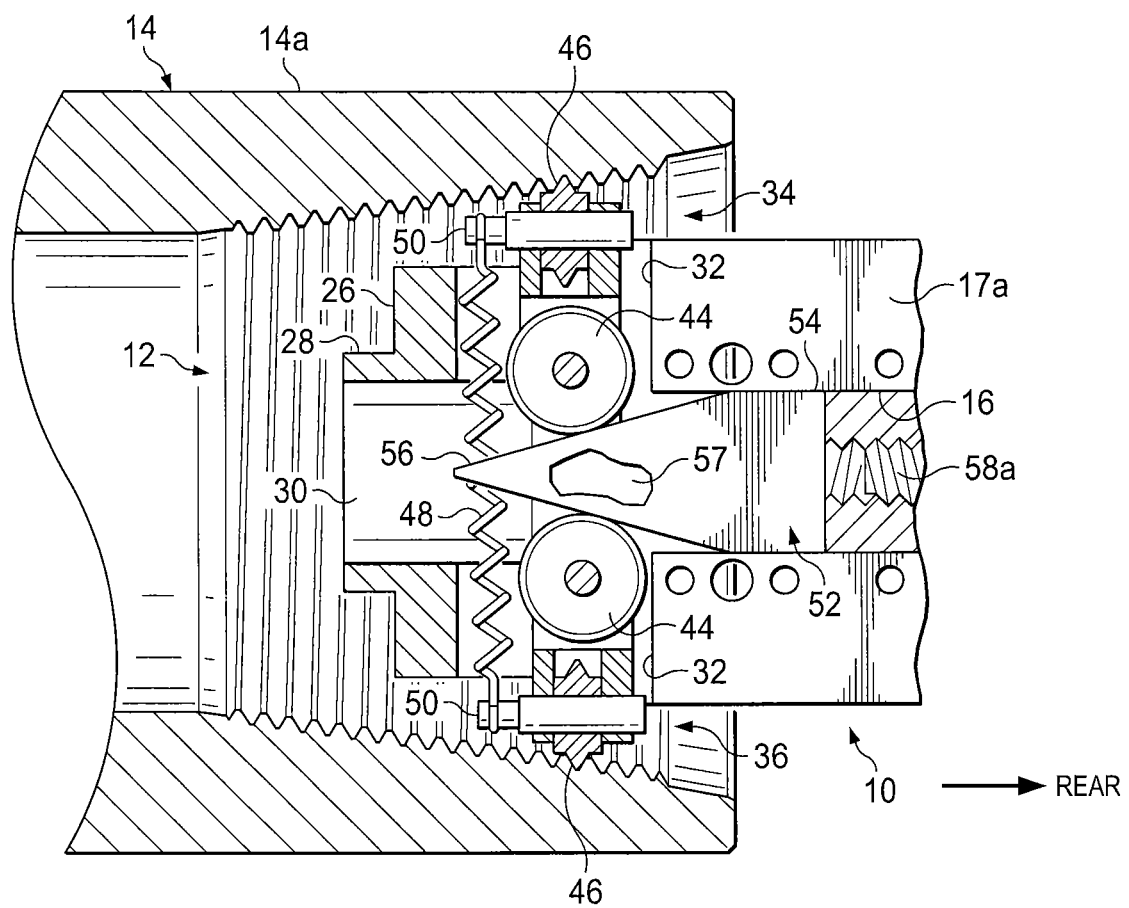
FIG. 9 is a longitudinally foreshortened cross-sectional illustration of an internally threaded end portion of a metal tubular member whose screw thread roots are being burnished using the FIG. 1 assembly
Figure 10:
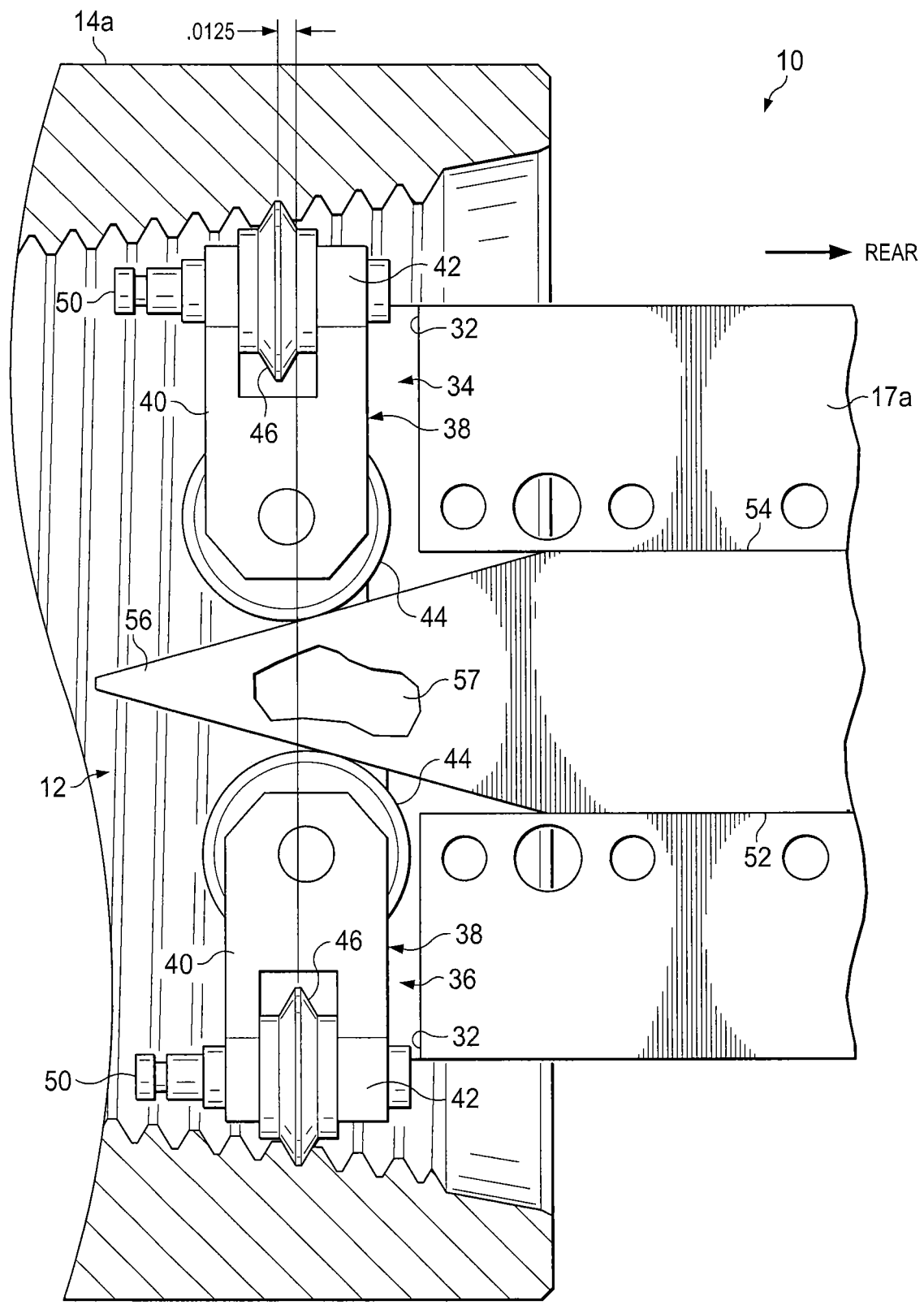
FIG. 10 is an enlarged scale detail view of a portion of the structure cross-sectionally illustrated in FIG. 9.

Selectively utilizing pressurized air in the cylinder 20, the drive rod 96 may be forwardly stroked to thereby forwardly force the tapered front cam portion 56 between the cam follower wheels 44, thereby vertically separating the wheels 44 and vertically driving the thread burnishing wheels 46 in opposite directions to move them, against the resilient resistive force of the spring 48, from their retracted positions shown in FIGS. 1-8 to extended positions as shown in FIGS. 9 and 10. As the pointed tip of the wedge cam 52 passes forwardly beyond the cam follower wheels 44 the spring 48 enters the clearance slot 57 in the tapered front cam portion 56 (see FIGS. 9 and 10) to avoid undesirable interference between the cam 52 and the spring 48. To prevent the forward stroking of the threaded rod 58 from causing the cam follower wheels 44 from undesirably reaching and rolling along the flat top and bottom sides of the rear cam portion 56, the stop block (which is of a predetermined front-to-rear width) functions to limit the forward travel of the rod 58 by means of acting of a front abutment for the front end of the tubular adapter structure 62.

The air cylinder 20 is controlled by a conventional four-way lever valve (not shown). When it is desired to retract the extended cartridges 34,36 the valve is appropriately switched to cause the air cylinder drive rod 96 to retract the rod 58 and wedge cam 52, thereby permitting the spring 48 to retract the extended cartridges 34,36.

As mentioned previously herein, the tubular work piece member 14 (see FIGS. 9 and 10) whose internal screw thread array 12 is to be burnished is chucked into a suitable machine, such as a lathe (not shown), for supporting and controllably rotating the work piece 14 about its axis. In a convenient manner which will now be described, the thread roller burnishing assembly 10 may be supported on the lathe's tool post holder 102 (a portion of which is schematically depicted in phantom in FIGS. 3 and 7).

Turning now to FIGS. 1-4 and 7, a spacer bar 104 is secured to and outwardly projects from the right side of the spacer adapter housing 18 and is secured at its outer end to an elongated slide rail 106 that longitudinally extends in a front-to-rear direction. Slide rail 106 is supported by a ball slide carrier 108 for longitudinal movement relative thereto in a front-to-rear direction. In turn, the ball slide carrier 108 is supported on the left side of a vertically oriented adapter plate 110 having a transverse mounting bar 112 projecting outwardly from the right side of the adapter plate 110. The burnishing assembly 10 is supported by the tool post holder 102 (see FIGS. 3 and 7) which appropriately clamps onto the mounting bar 112.

Supported in this manner, the roller head assembly, spacer adapter housing and air cylinder portions 16,18,20 of the thread burnishing assembly 10 may slidingly move forwardly and rearwardly relative to the tool post holder 102 during the screw thread burnishing process which will be subsequently described herein. Additionally, the rod, wedge cam, and roller cartridge portions 58,52,36,38 of the thread burnishing assembly 10 may move relative to the balance of the assembly 10 independently of the sliding movement of the assembly 10 relative to the tool post holder 102. While the air cylinder 20 is illustratively supported for movement with the balance of the burnishing assembly 10, it could alternatively be provided with suitable hydraulic accessories and stationarily positioned remotely from the balance of the burnishing assembly 10.

Figure 11:
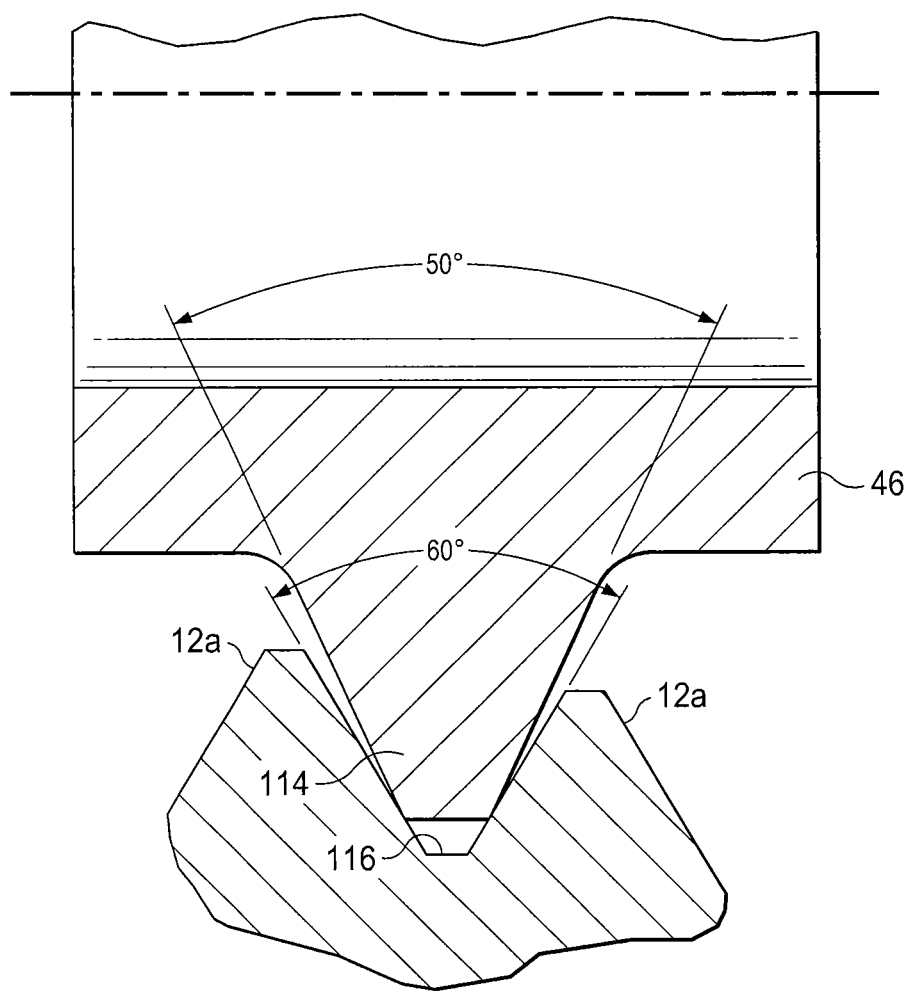
FIG. 11 is an enlarged scale cross-sectional view of a portion of one of the burnishing rollers of the FIG. 1 assembly operatively received within a FIG. 10 screw thread and burnishing the root area thereof.
Figure 12:
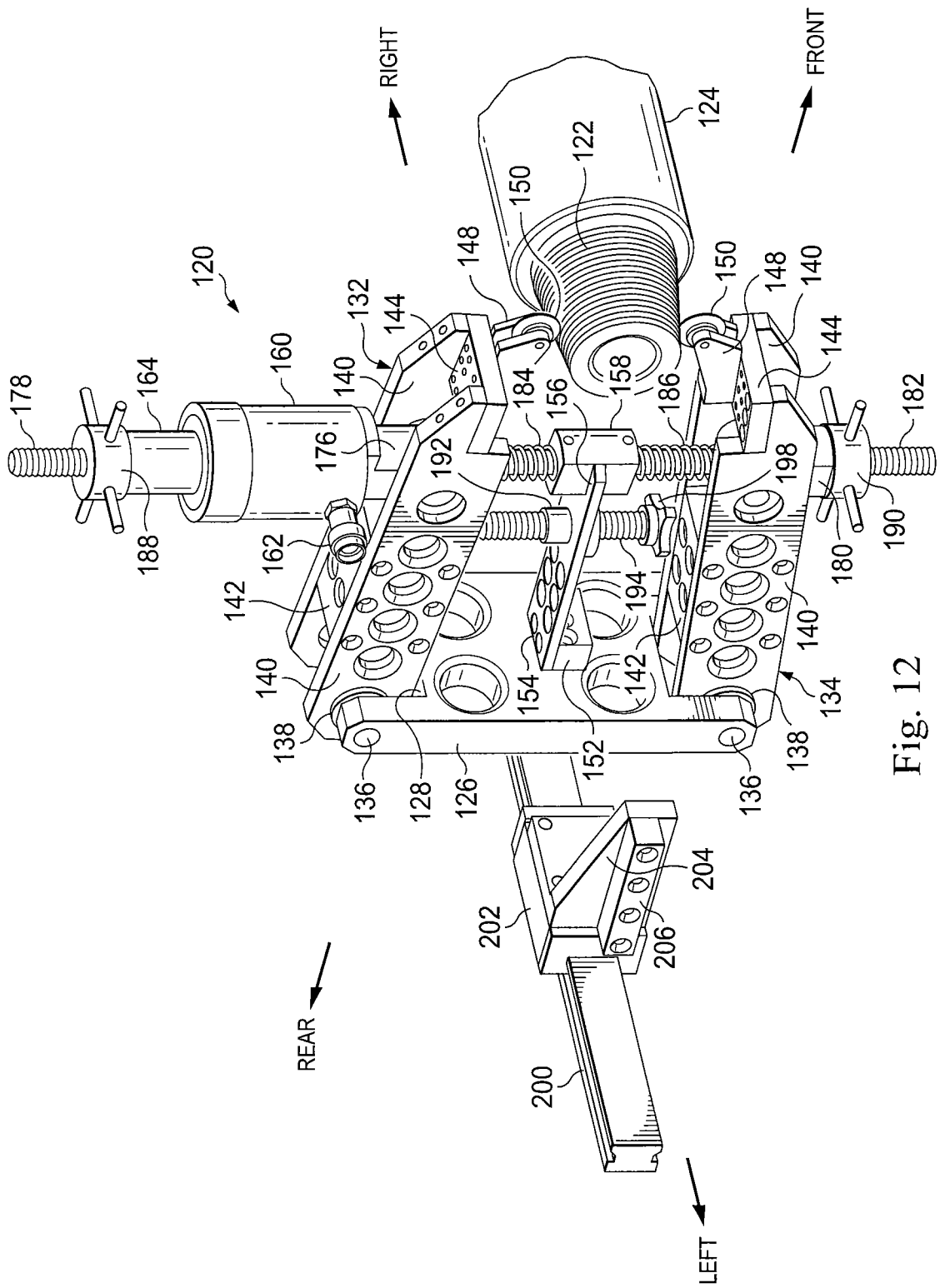
FIG. 12 is a left side perspective view of an external screw thread roller burnishing assembly embodying principles of the present invention.
Figure 13:
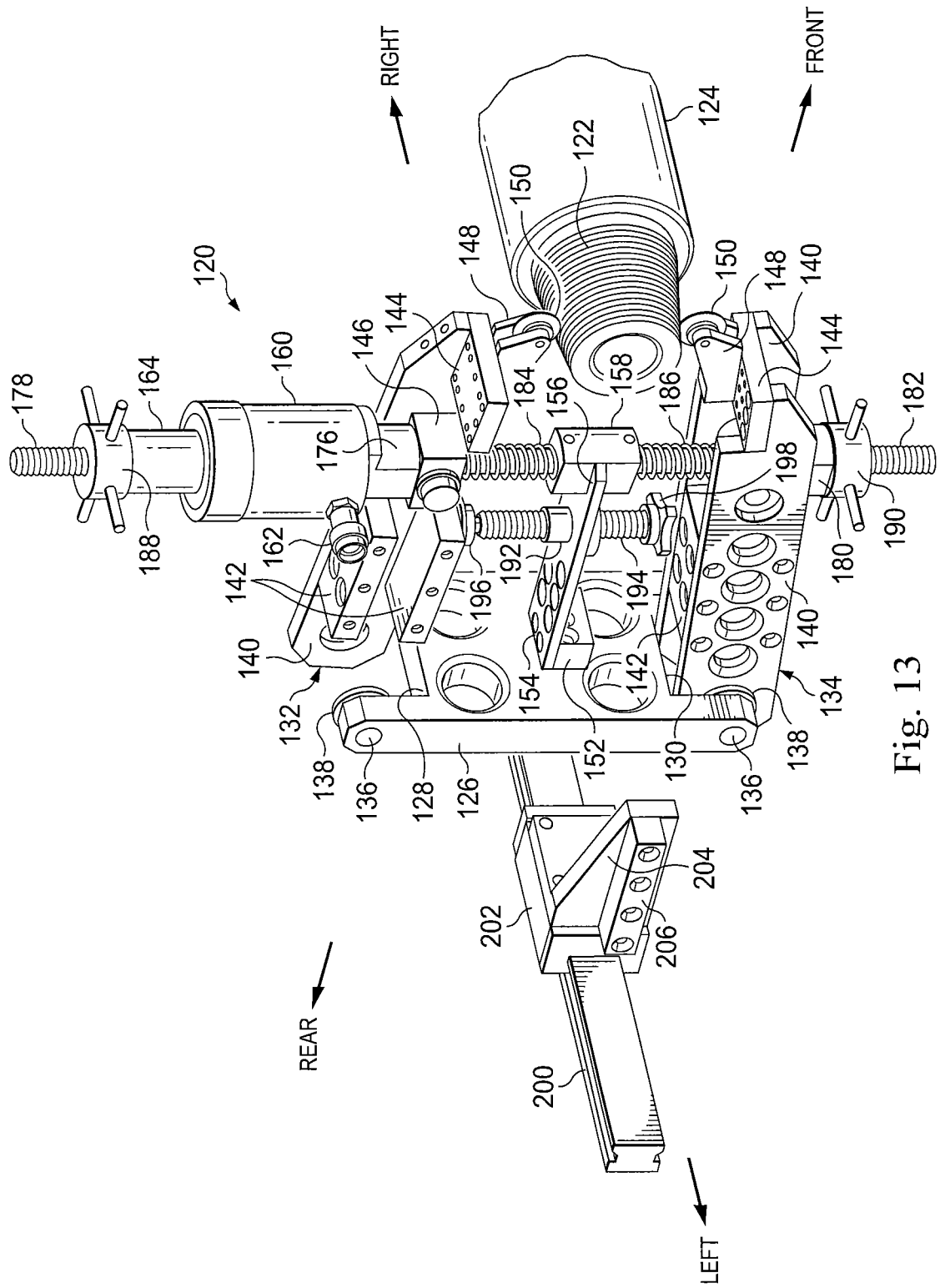
FIG. 13 is a perspective view similar to that in FIG. 12, but with portions of the FIG. 12 assembly having been removed for illustrative purposes.
Figure 14:
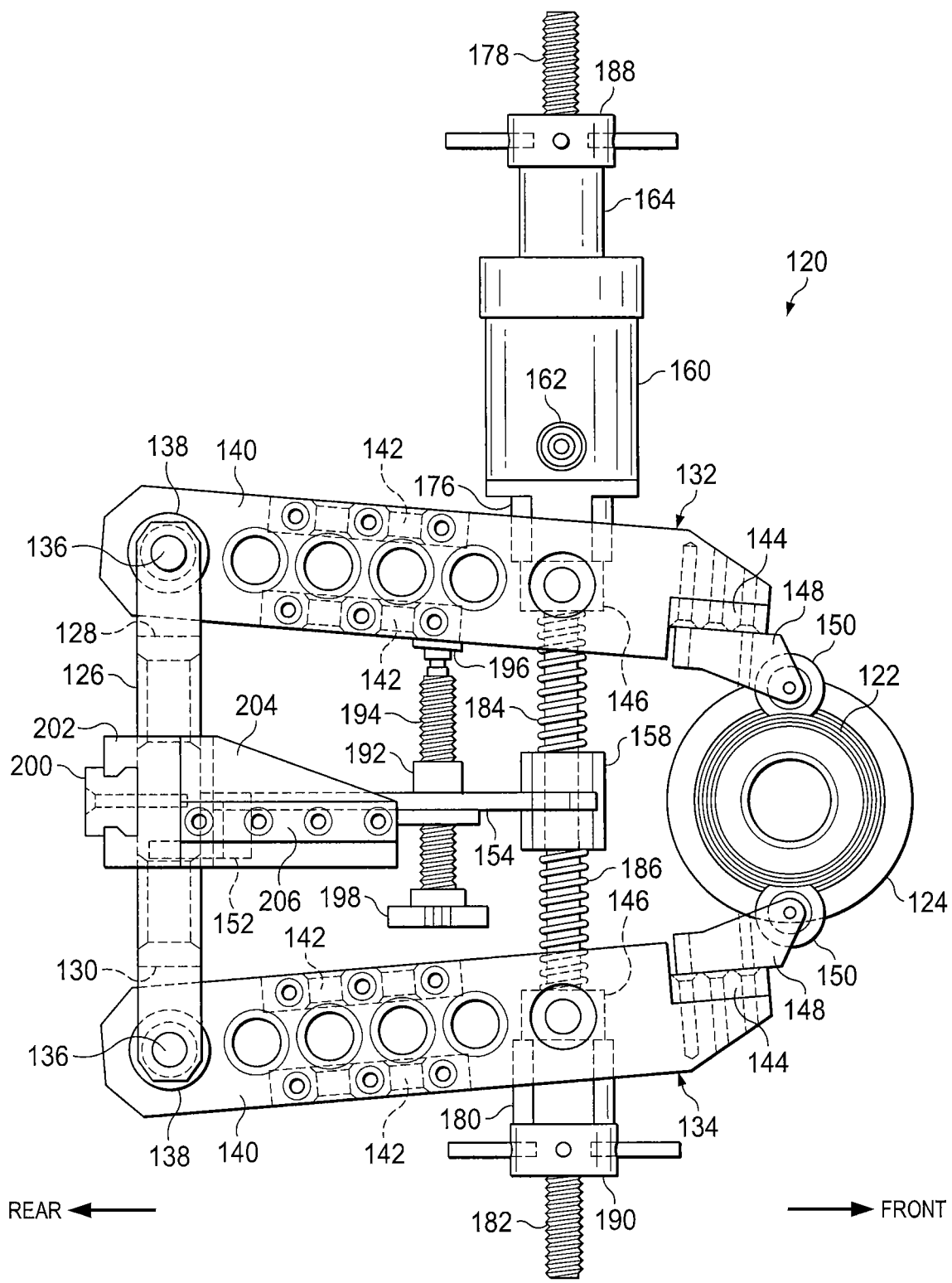
FIG. 14 is a left side elevational view of the FIG. 12 roller burnishing assembly.

The use of the assembly 10 to burnish the interior screw thread array 12 in the tubular work piece member 14 will now be described with reference to FIGS. 9-11. With the tubular member 14 chucked into a lathe, the thread roller burnishing assembly 10 operatively secured to the lathe's tool post holder 102 as previously described herein, and the front end block 26 disposed in an outward, facing relationship with the rear end of the tubular member 14, the assembly 10 is centered relative to the longitudinal axis of the tubular member 14 using the centering boss 28 of the assembly 10. This centering may be carried out in a conventional manner by spinning a sensor around the axis of the tubular member 14 and the periphery of the centering boss 28 and using a centering gauge to indicate horizontal and/or vertical axial misalignments between the axes of the centering boss 28 and the tubular member 14. Remaining misalignments may be corrected by using the vertical adjustment in the tool post holder 102 and/or the cross-slide axis.

With the assembly 10 centered relative to tubular member 14 in this manner, and the thread burnishing wheels 46 in their retracted positions, the assembly 10 is forwardly moved into the end portion 14a of the tubular member 14 until the retracted burnishing wheels 46 are appropriately aligned with the outermost end of the screw thread array 12 (i.e. the rightmost threads as viewed in FIGS. 9 and 10). Then, the air cylinder 20 is utilized to forcibly drive the opposed burnishing wheels 46 outwardly from their retracted positions to extended positions in which the annular tapered peripheral sections 114 of the burnishing wheels 46 enter the valleys between adjacent threads 12a (see FIG. 11) and exert high burnishing forces (representatively in the range of from about 700 pounds to about 2000 pounds of burnishing force for each burnishing wheel) on the root areas 116 of adjacent threads 12a.

Representatively, the angle between facing sides of each adjacent screw thread pair is 60 degrees (see FIG. 11), while the corresponding taper angle of the burnishing wheel tip sections 114 is somewhat less—illustratively 50 degrees. This provides a small clearance between the burnishing wheel tips 114 and the adjacent thread side walls to accommodate small misalignments between the assembly 10 and the tubular member 14 and compensate for the spiral angle of the threads 12a.

As can be best seen in FIG. 10, when they are operatively engaged with the screw thread 12, the two burnishing wheels 46 are essentially diametrically opposed from one another, being axially offset from one another by only one half of the thread pitch distance (illustratively 0.125 inches as indicated in FIG. 10). Importantly, because the burnishing wheels 46 are diametrically opposed from one another, they exert no appreciable net burnishing force on the tubular member 14, thereby eliminating the conventional need for complex auxiliary support structures for the tubular member 14—both the tubular member 14 and the thread burnishing assembly 10 may be conventionally supported on a lathe.

With the wheels 46 in forcible initial burnishing engagement with the rightmost thread in the internal screw thread 12, the lathe is operated to slowly rotate the tubular member 14 in the appropriate direction to cause the screw thread 12, via its engagement with the burnishing wheels 46, to forwardly move the roller head portion 16 of the thread roller burnishing assembly 10 into the tubular member 14 and thereby cause the burnishing wheels 46, by virtue of the wheels 46 following the thread pitch lead of the screw thread 12, to progressively burnish the screw thread root area 116 around its rearwardly spiraling length. As the burnishing wheels 46 are being drawn axially inwardly through the screw thread 12 they encounter progressively smaller diameter threads which automatically move the opposed burnishing wheels 46 toward one another against the yielding fluid pressure resistance of the pressurized air in the cylinder 20 to compensate for the decreasing diameters of the threads whose roots are being burnished.

When the burnishing wheels 46 reach the axially inner end of the screw thread 12, the lathe is stopped and then reversed to drive the wheels 46 back to their starting positions. The four-way control valve for the cylinder 20 is then appropriately switched to retract the wheels 46 as previously described herein With the opposed burnishing wheels 46 retracted, the roller head portion 16 of the thread roller burnishing assembly 10 is rearwardly moved to move the burnishing wheels 46 outwardly from the interior of the tubular member 14.

To facilitate the stopping of the rotation of the tubular member 14 when the burnishing wheels 46 reach the axially innermost thread of the screw thread 12, the axial length of the screw thread 12 is first measured. Then, with the top burnishing roller 46 operatively engaging the axially outermost thread, a suitable external mark is made on the outside of the roller head assembly 16 at a distance rearwardly of the outer (i.e., rear) end of the tubular member 14 equal to the measured axial length of the screw thread 12. When, during the burnishing process, the mark reaches the outer end of the tubular member 14 the lathe is stopped, and the previously described return to start and removal sequence is performed.

The screw thread roller burnishing assembly embodiment 10, as described above, is adapted to burnish internal screw threads. As will now be described in conjunction with FIGS. 12-15, the present invention also provides a representative embodiment 120 of a screw thread roller burnishing assembly adapted to burnish external screw threads.

Turning now to FIGS. 12-15, the external screw thread roller burnishing assembly 120 may be utilized to burnish an external screw thread 122 disposed on an end of a tubular member 124 chucked into a lathe (not shown) for controlled rotation about the axis of the tubular member 124. The screw thread 122 is representatively a tapered thread, but could alternatively be a straight, non-tapered screw thread without departing from principles of the present invention. Moreover, as was the case in the previously described internal screw thread roller burnishing assembly 10, the screw thread 122 could be incorporated in a variety of work pieces having nontubular configurations without departing from principles of the present invention.

The screw thread burnishing assembly 120 comprises a vertical rear anchor plate 126 having notches 128,130 respectively formed in its upper and lower ends. Elongated upper and lower arm structures 132,134 longitudinally project forwardly from the anchor plate 126, with rear ends of the arm structures 132,134 being respectively pivoted in the anchor plate notches 128,30 by means of pivot shafts 136, and associated ball bearings 138 located in the rear ends of the upper and lower arm structures 132 and 134, that permit the upper and lower arm structures 132,134 to vertically pivot toward and away from one another. Each of the upper and lower arm structures 132,134 has a pair of laterally spaced apart elongated side plates 140 joined at rear portions thereof by vertically spaced pairs of side plate spacers 142, and at front end portions by mount pads 144. Pivotally extending between each of the upper and lower pairs of side plates 140, between the pairs of side plate spacers 142 and the mount pad 144 is a gimbal block 146 (see FIGS. 13 and 14). A pair of upper and lower support yokes 148 are respectively secured to vertically facing side surfaces of the upper and lower mount pads 144 and pivotally support opposing upper and lower thread burnishing wheels 150 separated from one another in a left-to-right direction by a distance equal to one half of the pitch distance of the external screw thread 122.

A mounting block 152 is fixed to the front side surface of the rear anchor plate 126 and supports a rear end portion of a forwardly projecting elongated center stabilizing bar 154 centrally disposed between the upper and lower arm structures 132,134 and having a front end notch 156 that receives a draw bar rod coupler member 158. The rod coupler member 158 is configured so that can translate vertically and in a front-to-rear direction in the notch 156, but is precluded from rotating relative to the stabilizing bar 154 about a vertical axis.

Figure 15:
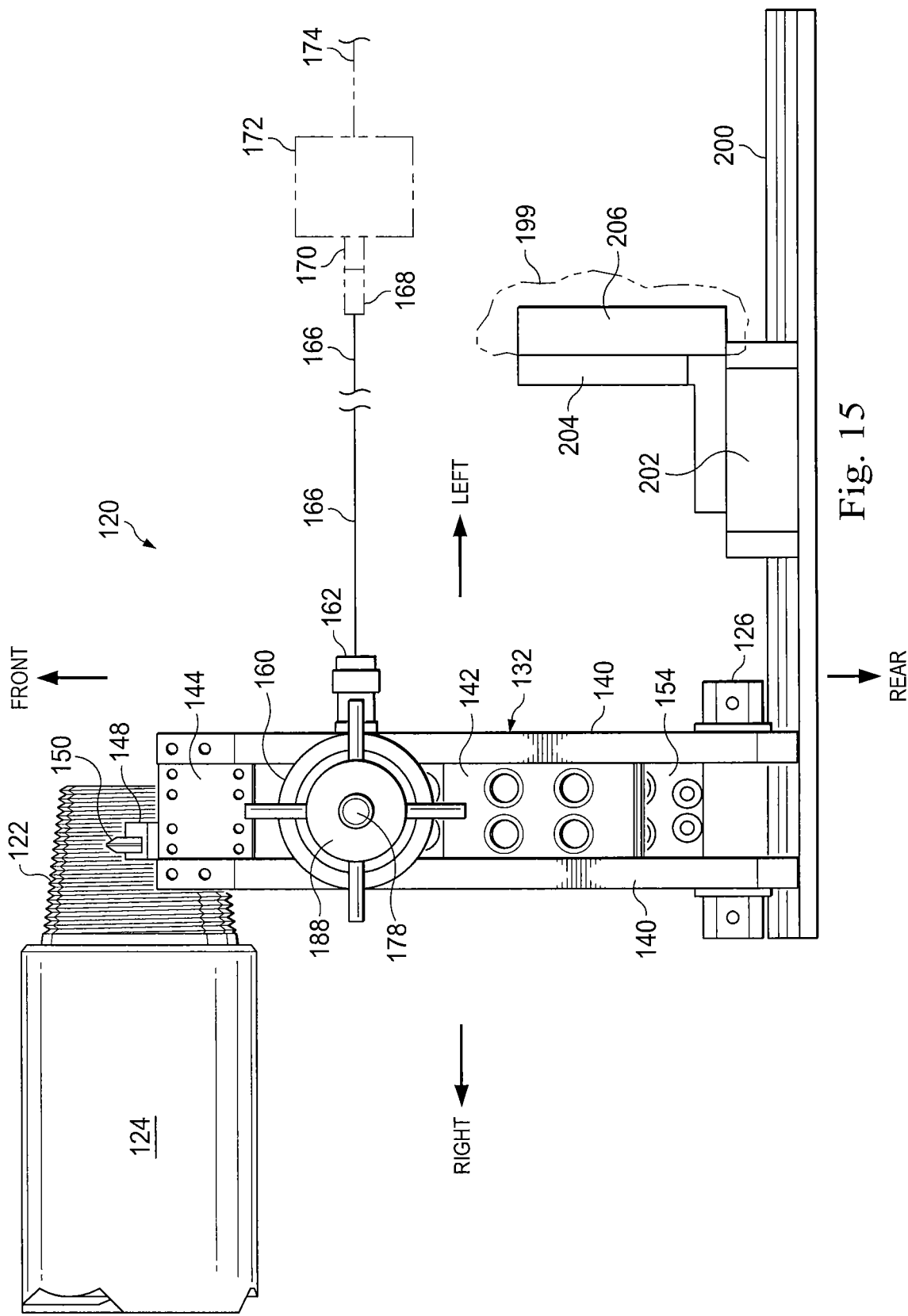
FIG. 15 is a top plan view of the FIG. 12 roller burnishing assembly.

Positioned on the top side of the burnishing assembly 120 (see FIGS. 13 and 14) is a hollow piston type hydraulic cylinder 160 having a hydraulic fluid inlet fitting 162 on its side, and a hollow internal piston 164 which is shown in its uppermost, fully extended position for illustrative purposes. When fully retracted, the top end of the piston 164 is at the top end of the cylinder 160. As schematically depicted in FIG. 15, the hydraulic cylinder 160 is representatively powered via a conventional "air-over-hydraulics" system" in which a hydraulic supply line 166 is coupled at one end to the inlet fitting 162 of the hydraulic cylinder, and at the other end to a hydraulic cylinder piston rod 168 coupled in turn to the air piston rod portion 170 of an air cylinder 172 receiving pressurized air, at a regulated pressure, from a suitable source 174 thereof (for example, "shop air"). The bottom end of the hydraulic cylinder 160 (see FIG. 13) is fixedly secured to the top side of cylinder mount adapter spacer 176 which, in turn, is fixedly secured to the top side of the upper gimbal block 146.

An upper threaded draw bar rod 178 slidably and non-threadingly extends downwardly through the hollow piston 164, the hydraulic cylinder 160, the adapter spacer 176 and the upper gimbal block 146 and is fixedly secured at its lower end to the upper end of the draw bar rod coupler 158. Fixedly secured to the underside of the bottom gimbal block 146 is a bottom spin nut spacer 180. A lower threaded draw bar rod 182 slidably and non-threadingly extends upwardly through the bottom spin nut spacer 180, and the bottom gimbal block 146, and is fixedly secured at its upper end to the bottom end of the draw bar rod coupler 158.

An upper helical compression spring 184 circumscribes a lower end portion of the upper threaded rod 178 and bears at its opposite ends against the underside of the upper gimbal block 146 and the upper end of the draw bar rod coupler 158. Accordingly, when the spring 184 is compressed it pivotally biases the upper arm structure 132 upwardly away from the lower arm structure 134. A lower helical compression spring 186 circumscribes an upper end portion of the lower threaded rod 182 and bears at its opposite ends against the lower end of the draw bar rod coupler 158 and the top side of the lower gimbal block 146. Accordingly, when the spring 186 is compressed it pivotally biases the lower arm structure 134 downwardly away from the upper arm structure 132. Above the upper end of the hollow piston 164 an upper spin nut 188 is threaded onto the upper draw bar rod 178, and below the bottom spin nut spacer 180 a lower spin nut 190 is threaded onto the lower draw bar rod 182.

As can be seen, by appropriately rotating the upper spin nut 188, the upper arm structure 132 may be selectively caused to pivot vertically toward or away from the lower arm structure 134. Similarly, by appropriately rotating the lower spin nut 190, the lower arm structure 134 may be selectively caused to pivot vertically toward or away from the upper arm structure 132. Stated in another manner, the upper spin nut 188 may be used to pivotally adjust only the upper arm structure 132 without changing the pivotal position of the lower arm structure 134, and the lower spin nut 190 may be used to pivotally adjust only the lower arm structure 134 without changing the pivotal position of the upper arm structure 132.

An internally threaded collar 192 extends upwardly through a longitudinally intermediate portion of the center stabilizing bar 154 and threadingly receives a centering adjustment screw 194. The screw 194 has, at its upper end, a gimbaled plate member 196 that bears against the underside of the bottom side plate spacer 142 of the upper arm structure 132. An adjustment knob 198 is fixedly secured to the bottom end of the screw 194. As can be seen, by turning the knob 198 in one direction, the arm structures 132,134 may be simultaneously pivoted in an upward direction, and by turning the knob 198 in the opposite direction the arm structures 132,134 may be simultaneously pivoted in a downward direction. A general vertical centering of the arm structures 132,134 is visually indicated when the front end of the center stabilizing bar 154 is generally centered along the vertical length of the draw bar rod coupler 158.

As mentioned previously herein, the tubular work piece member whose external screw thread array 122 is to be burnished, is chucked into a lathe (not shown) for controlled rotation of the tubular work piece member 124 about its axis. In a convenient manner which will now be described, the thread roller burnishing assembly 120 may be supported on the lathe's tool post holder 199 (a portion of which is schematically depicted in phantom in FIG. 15).

The vertical rear anchor plate 126 is fixedly secured to the front side of a ball slide rail 200 that longitudinally extends in a left-to-right direction and is slidably carried in a ball slide carriage block 202. Projecting forwardly from the carriage block 202 is an adapter plate 204 to which is secured a leftwardly projecting mounting bar 206 that may be clamped into the tool post holder 199 (see FIG. 15). With the screw thread burnishing assembly 120 supported in this manner on the tool post holder 199 in this manner it can be seen that the assembly 120 may slide leftwardly and rightwardly relative to the stationary ball slide carriage block 202 on the slidably carried ball slide rail 200. Additionally, the position of the assembly 120 may be adjusted vertically and in a front-to-rear direction using the tool post holder 199 and cross slide of the lathe.

Still referring to FIGS. 12-15, the use of the assembly 120 to burnish the exterior screw thread array 122 on the tubular work piece member 124 will now be described. With the tubular member 124 chucked into a lathe, the assembly 120 operatively secured to the lathe's tool post holder 199 as previously described herein, and the burnishing wheels 150 moved away from the external screw thread 122, the hydraulic cylinder 160 is pressurized to upwardly drive the hollow piston 164 to its operational extended limit position shown in FIGS. 12-14. Next, the assembly is adjusted (using the tool post holder 199, the screw thread knob 198 and the spin nuts 188,190 as necessary) to separate the opposed burnishing wheels 150 by a distance greater than the maximum diameter of the external screw thread 122 and to move the burnishing wheels 150 to a position in which they are centered (in a front-to-rear direction) over and under the first thread (i.e. the leftmost thread as viewed in FIG. 12) of the external screw thread 122.

The spin nuts 188,190 are then used to place the wheels 150 in operative contact (i.e., at full burnishing force) with the first thread. Next, the lathe is operated at a suitable low rotational speed in a manner such that the rotating external screw thread 122 drives the burnishing wheels 150 (and thus the entire assembly 120) rightwardly along the screw thread 122 and burnishes its root portion. When the operator sees that the wheels 150 have reached the axially inner end of the screw thread 122 he simply stops and reverses the lathe and performs the previously described return to start and removal sequence.

As in the case of the previously described internal screw thread burnishing assembly 10 (FIGS. 1-11), the resilient fluid pressure (via the pressurized air portion of the air/hydraulic system) in the assembly 120 automatically permits the wheels 150 to move outwardly, while still maintaining the requisite burnishing force on the screw thread 122, as the wheels 150 contact progressively larger diameter threads. Additionally, it can be readily seen that the assembly 120 does not require complicated and expensive custom made support structures to utilize it. It may be operatively connected to a conventional lathe. Furthermore, because the burnishing wheels 150 are diametrically opposed (being axially separated by only half of the pitch distance of the screw thread 122), there is no appreciable net burnishing force exerted on the tubular member 124 by the burnishing wheels 150.

Figure 16:
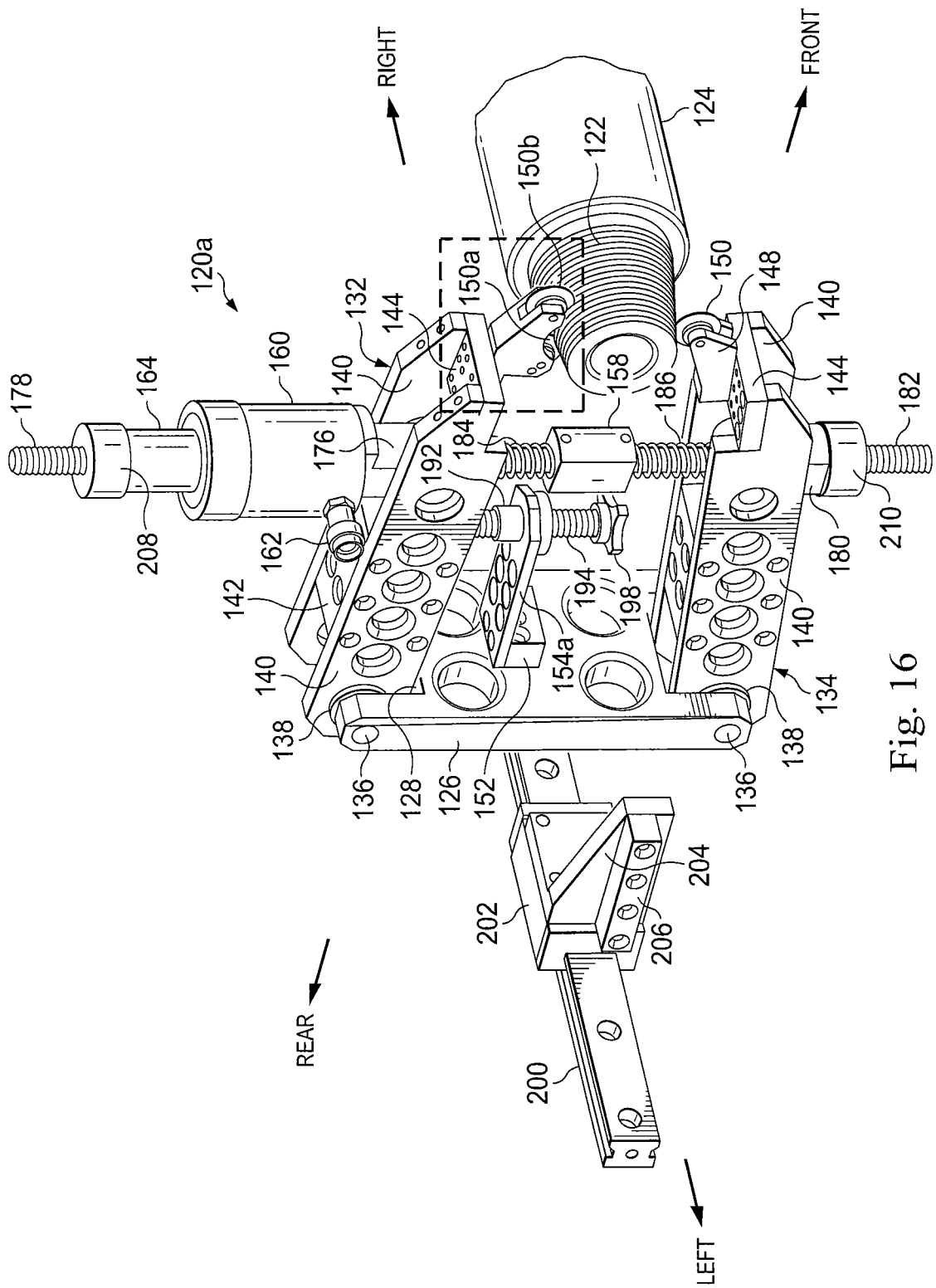
FIG. 16 is a left side perspective view of an alternate embodiment of the external screw thread roller burnishing assembly as shown in FIG. 12.
Figure 17:
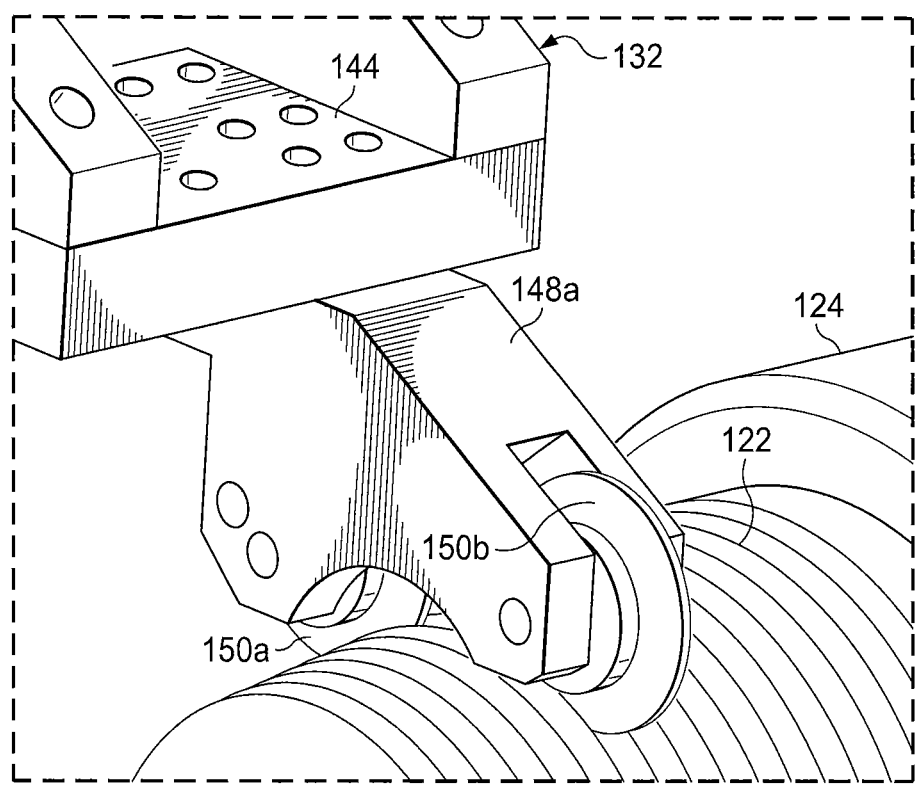
FIG. 17 is an enlarged scale detail view of the circled area "A" of the FIG. 16 alternate burnishing assembly embodiment.

A preferred alternate embodiment 120a of the previously described external screw thread burnishing assembly 120 is perspectively illustrated in FIG. 16. The modified assembly 120a may be movably supported on a tool post holder in the same manner as which the assembly 120 is supported on the tool post holder 199 in FIG. 15. As can be seen by comparing FIGS. 12 and 16 it can be seen that the assembly 120a is identical to the previously described assembly 120 with the following exceptions.

First, to provide an additional measure of engagement stability to the burnishing wheel portion of the assembly 120a, the upper single burnishing wheel 150 utilized in the assembly 120 is replaced with two circumferentially spaced upper burnishing wheels 150a,150b operatively carried in an appropriately reconfigured upper support yoke 148a that positions the wheels 150a,150b in diametrical opposition to the lower burnishing wheel 150.

Second, in the burnishing assembly 120a, the assembly 120 upper and lower spin nuts 188 and 190 are eliminated and replaced with upper and lower fixed nuts 208,210 respectively fixed to the hollow piston 164 and the bottom spacer 180 and threadingly engaged with the threaded upper and lower draw bar rods 178 and 182. Additionally, the threads on the upper and lower draw bars 178,182 are of opposite hands.

Third, the center stabilizing bar 154 used on the burnishing assembly 120 is replaced in the assembly 120a with a modified, shorter center stabilizing bar 154a which does not engage the draw bar rod coupler 158 and keep it from being rotated about the axes of the draw bar rods 178 and 182. Accordingly, in the assembly 120a, the arm structures 132,134 may be pivoted away from another by rotating the rod coupler 158 in one direction, and pivoted toward one another by rotating the rod coupler 158 in the opposite direction.

In summary, it can be seen from the foregoing that the present invention provides, in both internal and external thread embodiments, screw thread burnishing apparatus and associated methods in which diametrically opposed burnishing wheel structures are mounted on support and operating structure that may be held by the tool post holder of a lathe, on which a threaded work piece is rotatably supported, for selectively movement relative to the work piece.

The support and operating structure includes fluid drive apparatus for exerting resilient fluid pressure on the opposed burnishing wheels to move them in opposite directions into forcible burnishing engagement with the screw thread root portion without exerting an appreciable net burnishing force on the work piece.

Additionally, various structure is provided for adjusting the relative positions of the opposed burnishing wheels prior to their forcible burnishing engagement with the particular screw thread. The lathe is used to rotate the burnishing wheel-engaged work piece in a manner moving the burnishing apparatus axially along the screw thread. When a tapered screw thread is being burnished, the resilient fluid pressure force being exerted on the opposed burnishing wheels permits them to automatically readjust their relative positions as the diameters of the particular threads they are burnishing increase or decrease in diameter.

The foregoing detailed description is to be clearly understood as being given by way of illustration and example only, the spirit and scope of the present invention being limited solely by the appended claims.

The invention claimed is:

1. An apparatus for burnishing an external screw thread, comprising:
a support structure;
first and second members connected to said support structure at spaced apart locations thereon and being movable relative to said support structure toward and away from one another;
a pressure vessel operative to receive a pressurized fluid from a source thereof, said pressure vessel being anchored to said first member and having an extendable piston;
first and second thread burnishing structures respectively carried by said first and second members for movement therewith relative to said support structure; and
a linking structure coupled between said extendable piston of said pressure vessel and said second member and being threadingly adjustable to (1) retract said extendable piston of said pressure vessel and move said first and second members toward one another to bring said first and second thread burnishing structures respectively into fluid pressure-driven resilient burnishing contact with diametrically opposite side portions of the external screw thread, and (2) permit extension of said extendable piston of said pressure vessel and move said first and second members away from one another and out of fluid pressure-driven resilient burnishing contact with the external screw thread.

2. The apparatus of claim 1, further comprising:
a spring structure resiliently biasing said first and second members away from one another.

3. The apparatus of claim 1, wherein said first and second members are elongated arm members having inner end portions pivotally connected to said support structure and outer end portions respectively carrying said first and second burnishing structures for pivotal movement by said linking structure relative to said support structure.

4. The apparatus of claim 1, wherein said linking structure comprises:
a coupler member disposed between said first and second members;
a first threaded draw bar rod portion extending through said first member, said pressure vessel, and said extendable piston, said first threaded draw bar rod portion having a first end portion anchored to said coupler member and a second end portion projecting outwardly through said extendable piston;
a first spin nut threaded onto said second end portion of said first threaded draw bar rod and being rotatable relative to said first threaded draw bar portion;
a second threaded draw bar rod portion coaxial with said first threaded draw bar rod portion and extending through said second member, said second threaded draw bar rod portion having a first end portion anchored to said coupler member and a second end portion projecting outwardly through said second member;
a second spin nut threaded onto said second end portion of said second threaded draw bar rod portion and being rotatable relative to said second threaded draw bar rod portion;
a first spring member resiliently biasing said first member away from said coupler member;
a second spring member resiliently biasing said second member away from said coupler member; and
a stabilizing member operative to permit said coupler member to translate relative to said support structure parallel to a longitudinal axis of said first and second draw bar rod portions and prevent rotation of said coupler member about said axis;
wherein said first spin nut is rotatable in opposite directions to selectively move said first member toward or away from said second member prior to the burnishing of the external screw thread, and wherein said second spin nut is rotatable in opposite directions to selectively move said second member toward or away from said first member prior to the burnishing of the external screw thread.

5. The apparatus of claim 1, further comprising:
an adjustment structure operable to selectively move said first and second members simultaneously in a first direction or in a second direction opposite the first direction.

6. The apparatus of claim 5, wherein said adjustment structure includes:
a stabilizing member secured to said support structure; and
an adjustment member threadingly extending through said stabilizing member and bearing against one of said first and second members, said adjustment member being rotatable relative to said stabilizing member in opposite directions to selectively move said one of said first and second members in opposite directions.

7. The apparatus of claim 1, wherein said linking structure includes:
a coupler member disposed between said first and second members;
a first threaded draw bar rod portion extending through said first member, said pressure vessel, and said extendable piston, said first threaded draw bar rod portion having a first end portion anchored to said coupler member and a second end portion projecting outwardly through said extendable piston;
a first fixed nut threaded onto said second end portion of said first threaded draw bar rod portion and being fixedly secured to said extendable piston;
a second threaded draw bar rod portion coaxial with said first threaded draw bar rod portion, said second threaded draw bar rod portion being of an opposite hand than said first threaded draw bar rod portion and extending through said second member, said second threaded draw bar rod portion having a first end portion anchored to said coupler member and a second end portion projecting outwardly through said second member;
a second fixed nut threaded onto said second end portion of said second threaded draw bar rod portion and being fixedly secured to said second member;
a first spring member biasing said first member away from said coupler member; and
a second spring member biasing said second member away from said coupler member;
wherein said coupler member is rotatable in opposite directions about a longitudinal axis of said first and second threaded draw bar rod portions to selectively move said first and second members simultaneously toward one another or simultaneously away from one another.

8. The apparatus of claim 1, wherein said apparatus is configured to be connectable to a tool post holder of a lathe rotatably supporting a work piece with the external screw thread formed thereon, and wherein said apparatus is configured for movement with the tool post holder toward and away from the work piece in directions transverse to an axis of rotation of the work piece.

9. The apparatus of claim 1, wherein the external screw thread is formed on a work piece, and wherein said first and second burnishing structures are configured and positioned to burnish the external screw thread without imposing an appreciable net burnishing force on the work piece.

10. The apparatus of claim 9, wherein each of the first and second burnishing structures is a single burnishing wheel.

11. The apparatus of claim 9, wherein said first burnishing structure is a single burnishing wheel and said second burnishing structure is a pair of spaced burnishing wheels.

12. The apparatus of claim 1, wherein said pressure vessel is a portion of an air-over-hydraulics pressurized drive system.

13. The apparatus of claim 1, wherein the first and second thread burnishing structures are axially offset to one another by a half of a thread pitch distance.

14. The apparatus of claim 1, wherein each of the first and the second thread burnishing structures comprises a single burnishing tip configured to burnish a root area of the external screw thread.

15. The apparatus of claim 14, wherein the external screw thread is formed on a rotatable work piece, and wherein said first and second burnishing structures, during burnishing engagement with the external screw thread, exert no appreciable net force on the work piece.

16. An apparatus for burnishing an external screw thread, comprising:
a support structure;

first and second members connected to said support structure at spaced apart locations thereon and being movable relative to said support structure toward and away from one another;

a pressure vessel operative to receive a pressurized fluid from a source thereof, said pressure vessel being anchored to said first member and having an extendable piston;

first and second thread burnishing structures respectively carried by said first and second members for movement therewith relative to said support structure; and a linking structure, wherein a portion of said linking structure extends between said extendable piston of said pressure vessel and said second member, said linking structure being adjustable to (1) move said first and second members toward one another to bring said first and second thread burnishing structures respectively into contact with diametrically opposite side portions of the external screw thread, and (2) move said first and second members away from one another to move said first and second thread burnishing structures out of contact with the external screw thread, wherein said extendable piston is configured to extend out of said pressure vessel in a direction extending away from said first and second members and to retract into said pressure vessel in a direction toward said first and second members.

17. The apparatus of claim 16, wherein said linking structure comprises a threaded rod and a correspondingly threaded first nut, wherein said linking structure is adjustable by rotating said first nut with respect to said threaded rod to move said first nut along the length of said threaded rod.

18. The apparatus of claim 17, wherein said first nut is disposed on a portion of said threaded rod extending from said second member on a side of said second member opposite said first member.

19. The apparatus of claim 17, wherein said first nut is disposed on a portion of said threaded rod extending from said extendable piston and pressure vessel on a side of said extendable piston and pressure vessel opposite said first member.

20. The apparatus of claim 19, further comprising a second nut threaded correspondingly to said threaded rod, wherein said second nut is disposed on a portion of said threaded rod extending from said second member on a side of said second member opposite said first member, wherein said linking structure is adjustable by rotating said second nut with respect to said threaded rod to move said second nut along the length of said threaded rod.

21. The apparatus of claim 20, wherein said first and second nuts are selectably positionable prior to burnishing to pivot said second member toward said first member during burnishing by extending said extendable piston by increasing a volume of said pressurized fluid in said pressure vessel, thereby moving said threaded rod by pushing said first nut away from said first member with said extendable piston and simultaneously pulling said second nut toward said pressure vessel with said threaded rod.

* * * * *